Dec. 3, 1940.  H. H. MANDLE  2,223,806
MILL FEEDER
Filed Nov. 16, 1936
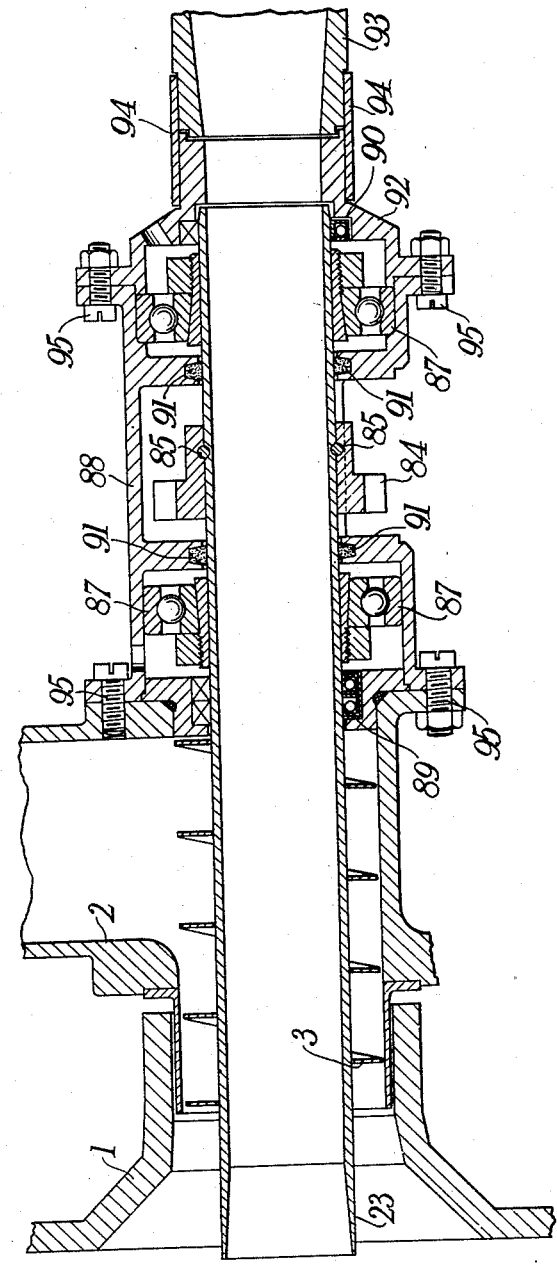
INVENTOR
Henry Hayman Mandle
BY Moses & Nolte
ATTORNEYS Patented Dec. 3, 1940

2,223,806

UNITED STATES PATENT OFFICE 2,223,806

MILL FEEDER

Henry Hayman Mandle, Closter, N. J., assignor, by mesne assignments, to United States Metal Powders, Inc., Baltimore, Md.

Application November 16, 1936, Serial No. 111,020
In Great Britain September 9, 1936

1 Claim. (Cl. 83—44)

The object of the present invention is to provide a simple and compact conveyor mechanism whereby separate materials may be conveyed separately and simultaneously and the individual amounts regulated while at the same time enabling the materials to be discharged separately into the introductory end of a common receptacle, such as a rotary boll mill.

The mechanism according to the present invention consists essentially of a worm conveyor with a hollow shaft forming a conveyor conduit through which one material can be fed, the other material being fed by the worm conveyor. A convenient mode of conveying material through the hollow shaft is by utilising the latter as a pneumatic conveyor, in which case the mechanism according to the invention represents the combination of a worm conveyor with a pneumatic conveyor, the shaft of the worm conveyor being hollow and forming the conduit for the pneumatic conveyor.

The accompanying drawing shows a preferred embodiment of the invention adapted for use in conjunction with a rotary drum, such as the drum of a ball mill for pulverising solid material. The drum 1, into which the material is to be introduced, receives the end of the worm conveyor 3 which is fixed externally upon a hollow shaft 23. The shaft 23 can be rotated by means of a gear wheel 84 keyed to the shaft by the pins 85. The mechanism for imparting the drive to the gear wheel 84 is not shown in the drawing, but any suitable gear wheel driven in appropriate manner can be caused to mesh with the gear wheel 84 below the shaft 23. Arranged above the worm conveyor 3 adjacent the end of the drum 1 is a hopper 2 from which material is supplied to a conduit disposed in surrounding relation to the worm. The conduit terminates short of the delivery end of the hollow shaft 23. The rate at which the material is fed from the hopper 2 to the interior of the drum 1 is determined by the rate at which the worm 3 is caused to rotate by means of the gear wheel 84. In the figure the outer or right hand end of the shaft 23 is mounted in spaced bearings 87 accommodated in the fixed housing 88. Packing rings 89 are provided between the fixed housing and the shaft adjacent the hopper 2 and a similar packing ring 90 is provided at the extreme right hand end of the shaft 23. On either side of the gear wheel 84, felt washers 91 or the like are provided between the housing 88 and the shaft 23 to prevent the lubricant supplied to the bearings 87 from escaping. At the outer end of the shaft 23 the housing 88 has an extension 92, to which a supply conduit 93 is attached by means of a clamping band 94. The extension 92 is secured to the fixed housing 88 and the latter is secured to the hopper 2 by means of bolts 95.

The conduit 93 serves for the introduction of a further material into the drum 1 and may for example constitute part of a pneumatic conveyor.

It is apparent that with a conveyor mechanism as described above two separate materials may be introduced separately but simultaneously into a common chamber where they are subjected to a common operation and the amounts of the separate materials may be controlled independently by adjusting the speed of rotation of the worm 3 on the one hand and by controlling the flow of material through the hollow shaft 23 on the other hand.

A particularly advantageous utilisation of the present conveyor mechanism in the production of metal powders is set out in my co-pending application Serial No. 111,021, filed of even date herewith, for Pulverizing system. There the materials fed by the pneumatic and worm conveyors are of the same nature but are at different stages in the common treatment of comminution in a mill such as a ball mill, and are fed into the mill by the two conveyors at speeds appropriate to the different stages of comminution, so that the final product is as uniform as possible.

I claim:

In a mill, the combination with a grinding drum of means for concurrently introducing material into the drum from separate sources of supply composed respectively of relatively coarse and fine material, comprising a rotary screw conveyor disposed co-axially with the drum for discharging the relatively coarse material into the drum at the introductory end thereof, said screw conveyor including a hollow rotary shaft having a relatively large internal diameter and a stationary surrounding conduit in which the screw conveyor operates, and a pneumatic conveyor discharging through the hollow shaft axially into the drum for delivering the relatively fine material to different points lengthwise of the drum according to the varying fineness of the material, said hollow shaft extending a substantial distance beyond the inner end of the screw conveyor and beyond the surrounding conduit and into the intake end of the drum, whereby the rate of feed of each of the materials may be controlled independently of the rate of feed of the other.

HENRY HAYMAN MANDLE.